April 10, 1956   E. M. BITTLE   2,741,286
GRATER
Filed Sept. 23, 1953
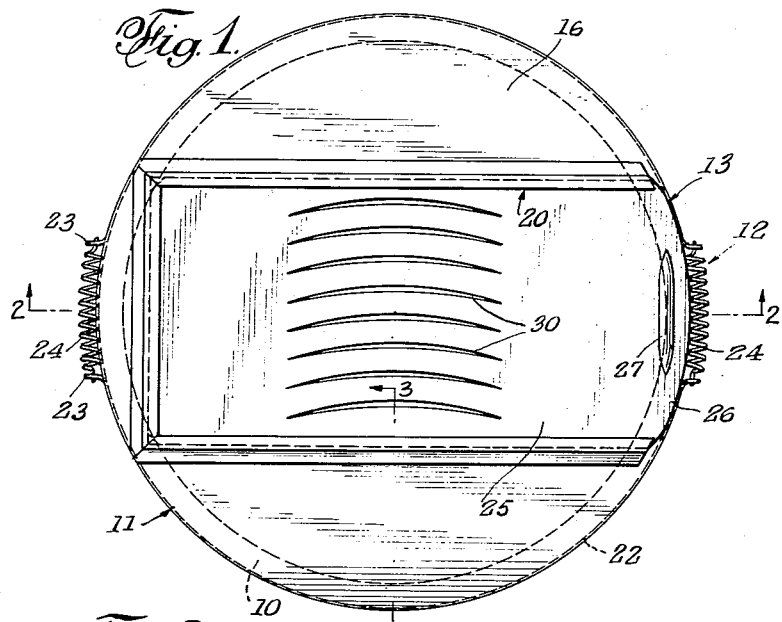
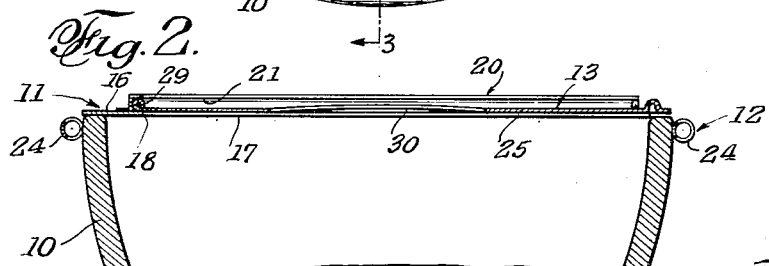
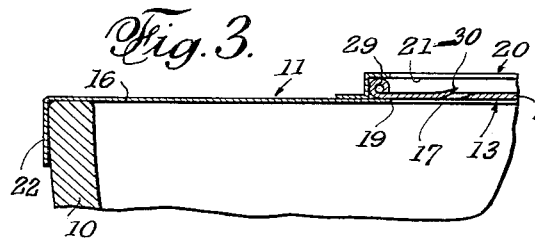
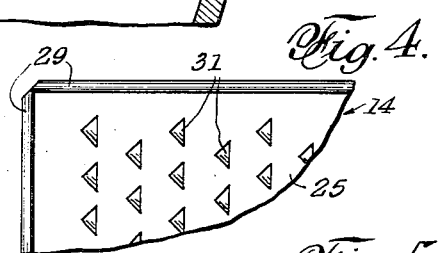
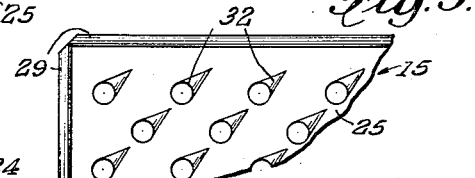
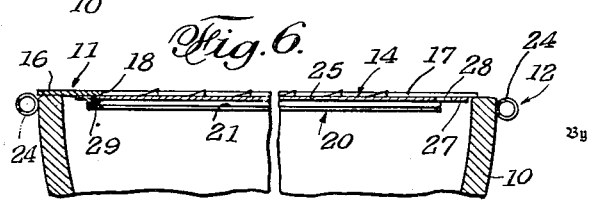
Inventor
ETHEL M. BITTLE
Attorney

United States Patent Office 2,741,286
Patented Apr. 10, 1956

2,741,286

GRATER

Ethel M. Bittle, Altadena, Calif.

Application September 23, 1953, Serial No. 381,815

4 Claims. (Cl. 146—180)

This invention relates to a grater construction and has for an object to provide a grater adapted to be removably mounted across the top of a bowl so that slices or particles resulting from use of the grater are deposited in the bowl without spillage and, therefore, in a clean and expeditious manner.

Another object of the invention is to provide a bowl-mounted grater construction that embodies a plurality of different grater elements and a frame holder for said elements, the former being selectively placed in the holder according to the type and form of slices or particles desired.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a top plan view of the present grater construction in operative position on a bowl, one grater element of a complement or set of such elements being shown.

Fig. 2 is a cross-sectional view as taken on line 2—2 of Fig. 1.

Fig. 3 is an enlarged cross-sectional view as taken on line 3—3 of Fig. 1.

Figs. 4 and 5 are fragmentary plan views of grater elements that may be included in a set of such elements.

Fig. 6 is a broken cross-sectional view similar to Fig. 2 of an alternate form of the invention, on a reduced scale as compared to the scale of Fig. 2.

The bowl 10 that is illustrated is generally conventional and, being of standard size, is adapted to mount the present grater construction without adjustment of the latter.

The grater construction that is illustrated comprises, generally, a frame holder 11 adapted to span across the top of bowl 5, means 12 to firmly yet removably mount said holder on said bowl, and a set of grater elements as exemplified by the elements 13, 14 and 15 shown in the drawing.

The frame holder 11 is preferably made of stainless steel plate or the equivalent, and is here shown as a plate 16 of circular form and size to cover the bowl opening. Plate 16 is provided with a rectangular opening 17 which is closed at one end 18 and open at the opposite end, the sides of said opening being defined by lateral edges 19. Thus, plate 16 has a U-shaped form in which the portions around opening 13 constitute closures for the bowl opening when the grater construction is in operative position thereon.

The plate 16, around opening 17, is provided with a frame 20 that forms, between itself and the opening edges 18 and 19, lateral and end grooves 21. These grooves serve as guides for the edges of elements 13, 14 and 15. Frame 20 may be advantageously formed of Z-sectioned strips spot welded to plate 16.

As shown in Figs. 1, 2 and 3, grooves 21 are provided above the top surface of plate 16 to enable interchanging of elements 13, 14 and 15 without disturbing the position of plate 16 on bowl 5 since these elements can be slid into and out of position across opening 17 above the rim of the bowl. Fig. 6 shows grooves 21 provided below the under face of plate 16, the Z-sectioned frame 20 being affixed to said face. While a slight upward displacement of the open end of plate 16 is necessary to effect replacement of the grater elements, as above indicated, this form has the important advantage of holding such elements against inadvertent endwise displacement since the rim of the bowl intercepts said element, as clearly shown at the right of Fig. 6. Regardless whether the grooves 21 are provided above or below plate 16, the same function as guideways for the grater elements, any one of which, together with said plate, spans across the top of bowl 5.

The means 12 for removably holding the holder 11 firmly on the bowl is shown as comprising a depending flange or band 22 that is preferably integrally bent from plate 16. To insure firm grip of the means on the rim of the bowl 5, the flange 22 may be interrupted as shown to provide opposed ears 23 to which the opposite ends of a coil spring 24 are attached. One or more such springs may be used, two, in opposed relation, being shown. The flange 22, being curved around the bowl rim, takes the lateral thrusts to which the present device may be subjected in use. The springs 24 obviate accidental upward displacement of the device. The ease and facility with which frame holder 11 may be placed on or removed from the bowl, or partially upwardly displaced so that interchangeability of a grater element may be effected in the form of Fig. 6, will be readily apparent from the above.

Except for the form and character of the grating, slicing and shredding openings provided in the exemplary elements 13, 14 and 15, these elements are alike in size and form. Each said element comprises a flat plate 25 of generally rectangular size and shape to conform to and fit into grooves 21. At one end, said plate 25 may be curved as at 26 and provided with a finger-engageable embossment 27 (Fig. 1) or a finger hole or slot 28 (Fig. 6).

The three edges of plate 25 that are engaged in grooves 21 are provided with beads 29 or are otherwise rolled or bent to stiffen said plate and constitute positions readily slidable in said grooves.

Fig. 1 shows element 13 as provided on the plate 25 thereof with slicing openings 30; Fig. 4 shows coarse grating portions 31; and Fig. 5, shredding portions and openings 32. It will be understood that the term "grater element," as used in the appended claims, includes each of these three exemplary elements and such others that may be provided with portions that rub, grate, slice, shred, etc.

While I have illustrated and described what I now contemplate to be the best modes of carrying out my invention, the constructions are, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. A grater for a circular open bowl comprising a flat circular plate having a depending peripheral flange engaging around the rim of said bowl, said flange comprising circumferentially spaced flange portions, and a resilient member spanning between and connecting said portions, said resilient member and said flange portions frictionally engaging the outside of said rim, a rectangular opening in said plate extending to the periphery thereof, a guide groove around three edges of said opening, and a grater element removably fitted in said guide groove and spanning said plate opening.

2. A grater for mounting on a circular edge of an open receptacle, said grater comprising a circular plate having a centrally located rectangular opening in said plate, a downwardly bent flange on said plate fitting over said circular edge, said flange having interrupted portions, spring means fitting into said portions to form a spring engagement between said flange and said edge for positive engagement therebetween, guide grooves along three sides of said rectangular opening, a second flat plate having three reinforced edges slidingly fitting respectively into said guide grooves, and a plurality of grating perforations within said second plate.

3. In a grater adapted to be mounted on a circular open-topped bowl, said grater having a depending peripheral flange for engaging the rim of said bowl, and spring means to hold said flange against said rim, the combination therewith of three guide members on said grater in a U-shaped arrangement, and a grater element removably fitted in said guide members, said element having a plurality of grater perforations therein with the cutting edges of said perforations aligned in a direction toward any one of said three guide members.

4. In a grater adapted to be mounted on a circular open-topped bowl, said grater having a depending peripheral flange for engaging the rim of said bowl and spring means to hold said flange against said rim, the combination therewith of three guide members on said grater in a U-shaped arrangement, and a grater element removably fitted in said guide members, said element having a plurality of grater perforations, said perforations being so formed and disposed that an item being moved in relation thereto to be grated is moved in a direction toward at least one of the guide members.

References Cited in the file of this patent

UNITED STATES PATENTS

| | | |
|---|---|---|
| 2,447,714 | Richards | Aug. 24, 1948 |
| 2,601,087 | Buedingen | June 17, 1952 |
| 2,615,486 | Marcus | Oct. 28, 1952 |